UNITED STATES PATENT OFFICE.

HEINRICH GRÜNHAGEN, OF BERLIN-KARLSHORST, GERMANY, ASSIGNOR TO ACTIEN GESELLSCHAFT FÜR ANILIN FABRIKATION, OF BERLIN, GERMANY.

HALOGENATED DYES OF THE ACRIDIN SERIES.

1,255,739. Specification of Letters Patent. Patented Feb. 5, 1918.

No Drawing. Application filed July 29, 1916. Serial No. 112,196.

*To all whom it may concern:*

Be it known that I, HEINRICH GRÜNHAGEN, residing at Berlin-Karlshorst, Germany, my P. O. address being Prinz Joachimstr. 13, Berlin-Karlshorst, Germany, have invented certain new and useful Improvements in Halogenated Dyes of the Acridin Series, of which the following is a specification.

According to my present invention halogenated dyes of the acridin series can be obtained by heating a halogen derivative of a formyl-meta-diamin of the benzene series with a salt of an aromatic meta-diamin. The underlying general graphic formula of the new dyes thus obtained corresponds to the formula:

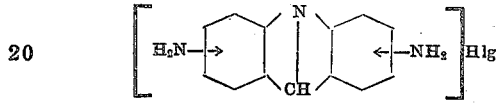

in which formula Hlg means one or more halogen atoms entering one or two of the benzene nuclei.

As a special type of dyes which this general formula comprises the following may be given:

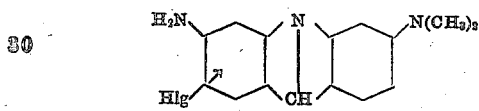

According to the above-given process such a dye can be obtained by heating a halogen derivative of a formyl-meta-phenylenediamin with a salt of meta-aminodimethylanilin or with a salt of a C-alkylated meta-aminodimethylanilin; for example 1-amino-3-formylamino-6-chlorobenzene is melted together with meta-aminodimethylanilin-hydrochlorid thus forming a dyestuff of the formula:

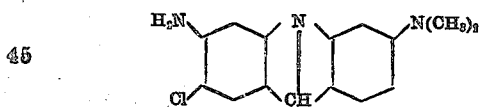

The following example may serve to illustrate my invention, the parts being by weight:

17 parts of 1-amino-3-formylamino-6-chlorobenzene are melted together with 21 parts of 3-aminodimethylanilin hydrochlorid in an enameled iron vessel provided with an agitator and with an oil bath; the temperature is gradually raised to 180° C. and the reaction is finished when the evolution of water vapors ceases. The melt is dissolved in water, the solution filtered if necessary and the dyestuff precipitated by adding a solution of common salt and of zincchlorid. The new dye in the dry state and pulverized forms a brown-black powder; it dyes leather clear reddish yellow tints.

Of course my present invention is not limited to the foregoing example or to the details given therein. For instance instead of meta-aminodimethylanilin a C-alkylated derivative thereof may be used, such as for instance 4-amino-2-dimethylamino-1-methylbenzene, or a halogenated derivative thereof, such as for instance 4-amino-2-dimethylamino-1-chlorobenzene. Furthermore, for instance, bromo-derivatives may be employed instead of the chloro-derivatives.

Having now described my invention, what I claim is,—

1. As new articles of manufacture new dyes of the acridin series the underlying general graphic formula of which corresponds to the general formula:

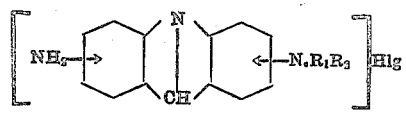

in which formula $R_1$ and $R_2$ signify univalent substituents including H and Hlg means halogen atoms entering benzene nuclei.

2. As new articles of manufacture new dyes of the acridin series the underlying general graphic formula of which corresponds to the general formula:

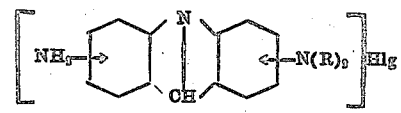

in which formula R signifies an alkyl group and Hlg means halogen atoms entering benzene nuclei.

3. As new articles of manufacture new dyes of the acridin series the graphic formula of which corresponds to the formula:

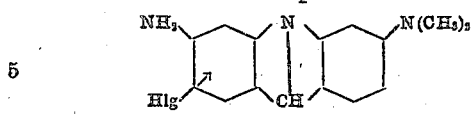

in which formula Hlg means a halogen atom.

4. As a new article of manufacture the new dye of the acridin series corresponding to the formula:

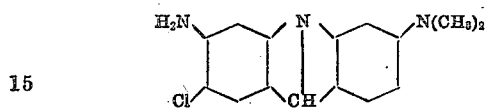

which dye in the dry state when pulverized forms a brown-black powder, dyeing leather clear reddish yellow tints.

5. As a new process for the manufacture of new dyes of the acridin series the process which consists in heating a halogen derivative of a formyl-meta-diamin of the benzene series with a salt of an aromatic meta-diamin.

6. As a new process for the manufacture of new dyes of the acridin series the process which consists in heating a halogen derivative of a formyl-meta-diamin of the benzene series with a salt of an alkylated meta-diamin of the benzene series.

7. As a new process for the manufacture of new dyes of the acridin series the process which consists in heating a halogen derivative of a formyl-meta-diamin of the benzene series with a salt of an N-alkylated meta-diamin of the benzene series.

8. As a new process for the manufacture of new dyes of the acridin series the process which consists in heating a halogenated formyl-meta-phenylenediamin with a salt of an unsymmetrically N-dialkylated meta-diamin of the benzene series.

9. As a new process for the manufacture of a new dye of the acridin series the process which consists in heating formyl-chloro-meta-phenylenediamin ($NH_2$:NH.CHO:Cl= 1:3:6) with meta-aminodimethylanilin-hydrochlorid.

In testimony whereof I have affixed my signature in presence of two witnesses.

HEINRICH GRÜNHAGEN.

Witnesses:
 HENRY HASPER.
 ALLEN F. JENNINGS.